US006972948B1

(12) United States Patent
New

(10) Patent No.: US 6,972,948 B1
(45) Date of Patent: Dec. 6, 2005

(54) COMPUTER DRAWER ASSEMBLY

(76) Inventor: Gerald W. New, 835 W. Lemon St., Brea, CA (US) 92821

( * ) Notice: Subject to any disclaimer, the term of this patent is extended or adjusted under 35 U.S.C. 154(b) by 214 days.

(21) Appl. No.: 10/656,457

(22) Filed: Sep. 5, 2003

(51) Int. Cl.$^7$ ............................................. G06F 1/16
(52) U.S. Cl. ................................................. 361/683
(58) Field of Search ............................ 361/684–685, 361/724–727; 312/223.1–223.3

(56) References Cited

U.S. PATENT DOCUMENTS 5,080,452 A * 1/1992 Tuckman ..................... 312/242
5,340,340 A * 8/1994 Hastings et al. .............. 439/64

* cited by examiner

Primary Examiner—Yean-Hsi Chang
(74) Attorney, Agent, or Firm—Walter A. Hackler

(57) ABSTRACT

A computer drawer assembly, preferably constructed from a rigid plastic material, includes a computer having an enclosure with at least one unused, standard-sized, 5¼ inch expansion slot having a detachable plate covering an entrance thereto. The computer enclosure is removable and covers a computer frame. A rectangular drawer holder is sized for being received and closely fitting into the unused expansion slot after removal of the detachable plate, and has a bottom, a top, opposing side walls and an open front. A drawer having a bottom, opposing sides and a closed front and rear closely fits into the drawer holder through its open front, being axially slidable in the drawer holder between a closed position fully recessed in said drawer holder and an open position extending from said open front of the drawer holder. At least one attaching screw aperture is formed in each of the drawer holder side walls corresponding to a location of standard installation screw apertures in the computer frame for installing standard hardware in the expansion slot, whereby the drawer holder can be secured in the unused expansion slot by screws extending through the computer frame and into the drawer holder. A lock is provided for locking the drawer in its closed position.

10 Claims, 4 Drawing Sheets

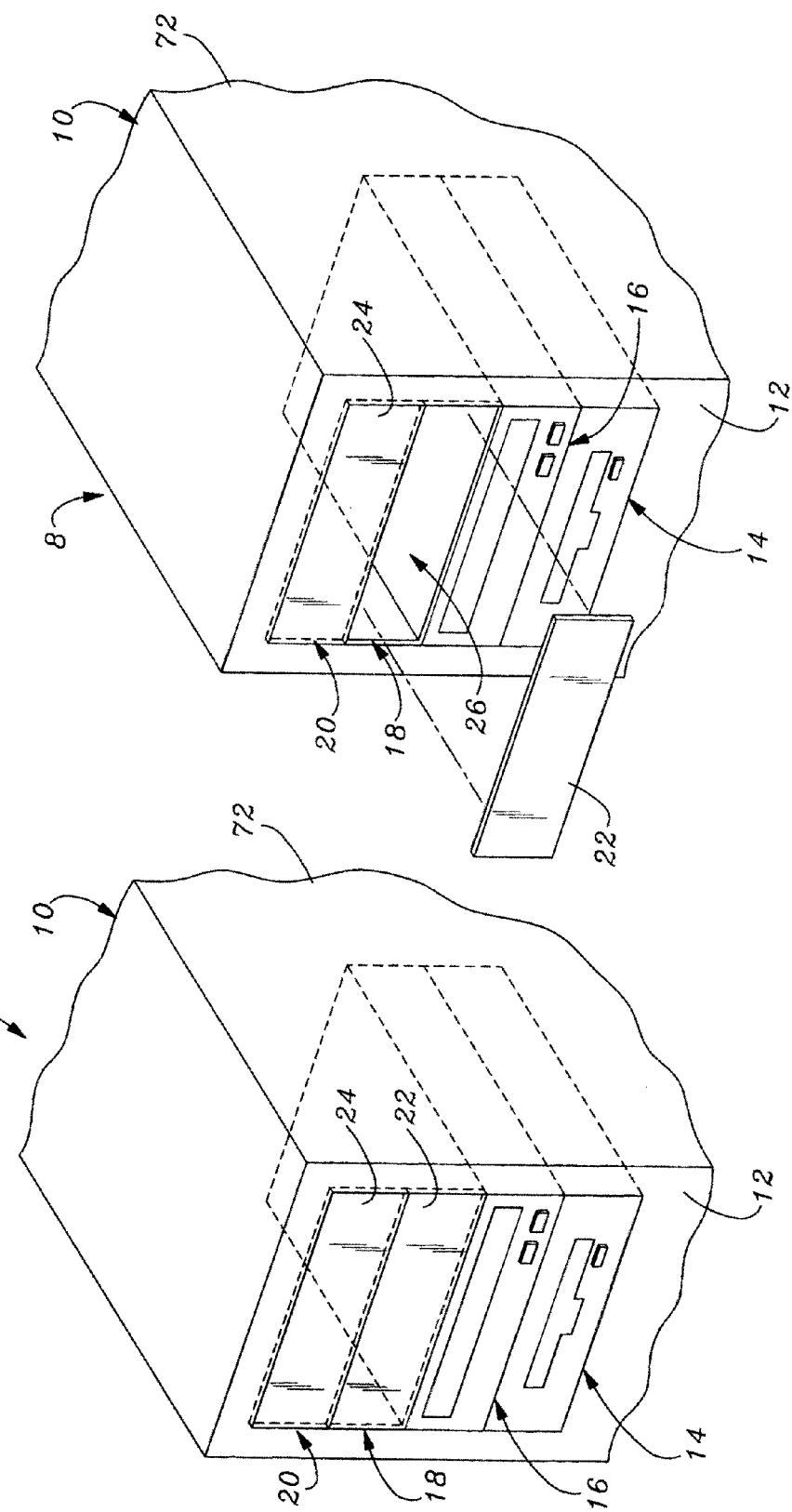

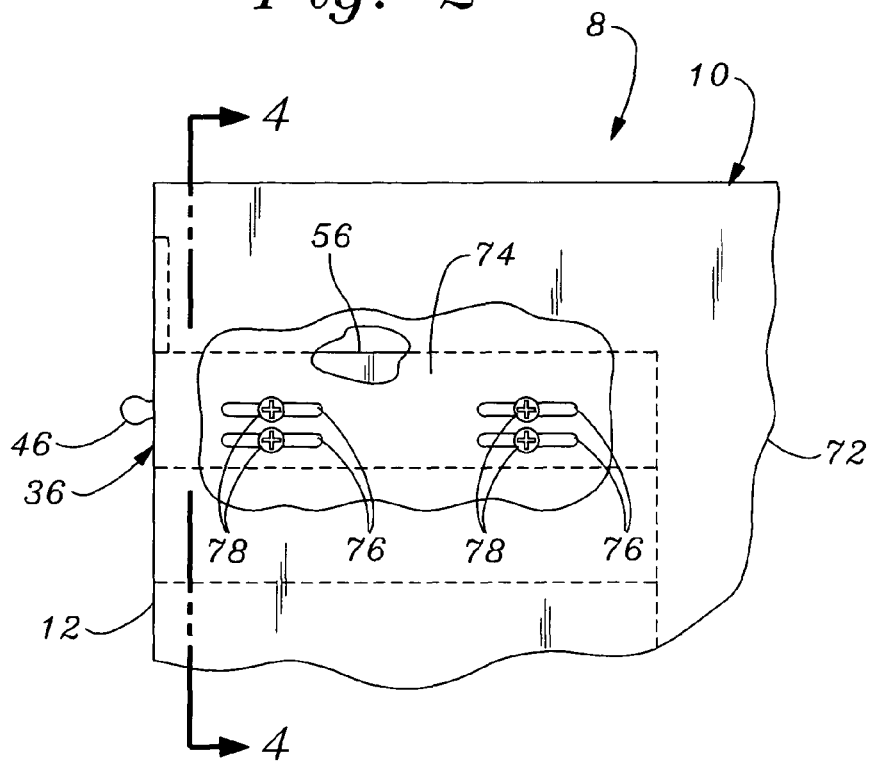
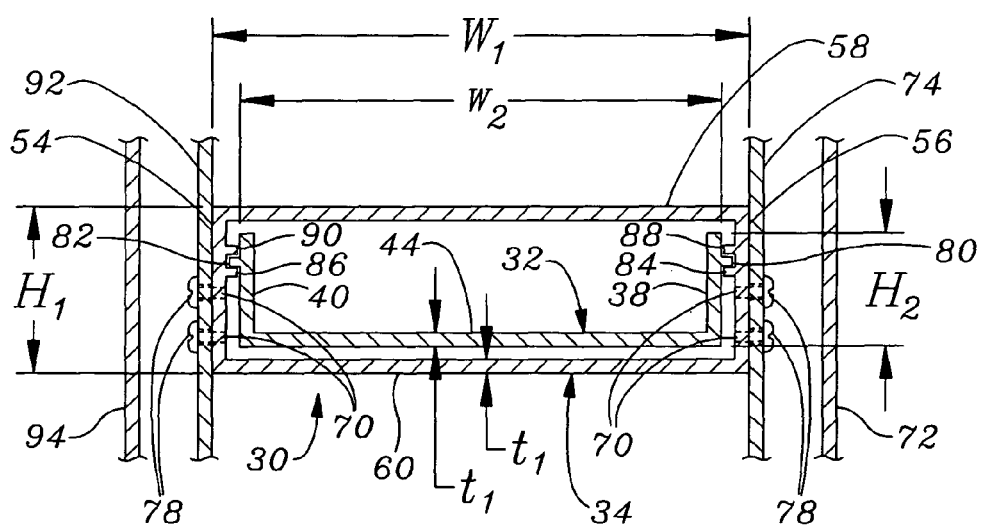

COMPUTER DRAWER ASSEMBLY

BACKGROUND OF THE INVENTION

1. Field of the Invention

The present invention relates generally to the field of computers and more particularly to provisions for storing such computer accessories as software programs, including program drivers, system recovery discs, data discs and the like, as well as other small items associated with a particular computer.

2. Background Discussion

Most frequent computer users soon acquire a relatively large number of computer discs (CDs) of various types. For example, most current computer programs are provided by suppliers in the form of computer discs (CDs). CDs for system backup and system recovery are also generally provided to purchasers of new computers.

Moreover, most software programs, such as digital games, operating system upgrades and other computer programs are currently provided on CDs. So too, when hardware, such as auxiliary hard drives, ZIP drives, printers, DVD players, digital cameras and ROM "burners," are added to computers, hardware driver CDs are provided with the hardware. These drivers enable the operating system of the computer on which the driver CDs are installed to communicate with and operate the hardware.

Still further, files and folders created on computers are typically saved or written on a periodic basis to CD-ROMs (or floppy discs) for recovery in the event of computer problems, for transfer from one computer to another, or for archival purposes.

Consequently, because of the number of acquired CDs (and floppy discs) and their usual storage in different places of convenience, the locating of needed CDs (and floppy discs) is often difficult and time consuming. Moreover, CDs (and floppy discs) tend to become lost or may become damaged as a result of careless or improper storage.

The particular problem of controlling CDs is made more complicated by the different computer operating systems which may be available in any one computer work area. Not even considering the basic operating system differences between Macintosh Apple computers using OS operating systems and IBM-type PCs generally using Microsoft operating systems, PC computers have in recent years utilized different Microsoft Windows 95, 98, 2000, ME and XP operating systems. However, most computer programs and hardware drivers on CDs are limited to installation on specific operating systems.

As an illustration, a particular printer model may have one driver CD for use (i.e., installation) of the printer on Windows 95, 98, 2000 and ME and a different driver CD for use (i.e., installation) of the same printer on Windows XP. An attempt to install the first mentioned driver CD on a Windows XP computer system will, at best, fail to install properly. At worst, an attempt to install the wrong driver CD can result in unpredictable corruption of other installed programs or of the computer operating system itself. In this regard, it should be mentioned that a printer driver (or other hardware driver) may be required in the event of printer (or other hardware) operating problems.

Furthermore, data-containing CDs and floppy discs made from a later operating system version generally cannot be used with earlier-version operating systems.

The maintaining control over all computer CDs and floppy discs and their segregation as may be necessary for use on a particular computer is thus important and often crucial to proper computer operation.

A principal objective of the present invention is thus to provide a convenient and appropriate computer storage of computer CDs (and floppy discs) so as to achieve the above-mentioned control.

SUMMARY OF THE INVENTIOM

A computer drawer assembly comprises a computer having an enclosure with an unused, standard-sized expansion slot, the unused expansion slot having a detachable plate covering an entrance thereto. Included is a rectangular drawer holder sized for being fully received and closely fitting into the unused expansion slot after removal of the detachable cover plate, the drawer holder being formed having a bottom, a top, opposing side walls and an open front. A drawer is sized for fitting into the drawer holder from the drawer holder open front, the drawer being formed having a bottom, opposing sides and a closed front and rear, the drawer being axially slidable in the drawer holder between a closed position recessed in the drawer holder and an open position extending from the open front of the drawer holder.

The standard-sized expansion slot is a conventional 5¼ inch expansion slot. The computer enclosure is detachable from the computer and the computer includes a frame covered by the enclosure. At least one attaching screw aperture is formed in each of the drawer holder opposing side walls, the location of the attaching screw apertures corresponding to a location of standard installation screw apertures in the computer frame for installing standard hardware in the expansion slot, whereby the drawer holder can be secured in the unused expansion slot by screws. More preferably four attaching screw apertures are formed in each of the drawer holder side walls, the location of the attaching screw apertures corresponding to a location of standard installation screw apertures in the computer frame for installing standard hardware in the expansion slot, whereby the drawer holder can be secured in the unused expansion slot by screws.

Preferably the drawer assembly includes a lock installed in the drawer for locking the drawer in the closed position relative to the drawer holder. Also preferably, the drawer and drawer holder are constructed from a rigid plastic material.

A computer drawer assembly comprises a computer having a computer enclosure with at least one unused, standard-sized, 5¼ inch expansion slot, the expansion slot having a detachable plate covering an entrance to the expansion slot. Included is a rectangular drawer holder sized for being received and closely fitting into the unused expansion slot after removal of the detachable cover plate, the drawer holder being formed having a bottom, a top, opposing side walls and an open front. Further included is a drawer sized for fitting into the drawer holder from the drawer holder open front, the drawer being formed having a bottom, opposing sides and a closed front and rear, the drawer being axially slidable in the drawer holder between a closed position fully recessed in the drawer holder and an open position extending from the open front of the drawer holder. Means are provided for securing the drawer holder in the unused expansion slot when the drawer holder is fully received into the unused expansion slot.

The computer enclosure is detachable from the computer which includes a frame covered by the enclosure. Four attaching screw apertures are formed in each of the drawer holder opposing side walls, the location of these attaching screw apertures corresponding to a location of standard installation screw apertures in the computer frame for installing standard hardware in the expansion slot, whereby the drawer holder can be secured in the unused expansion slot by screws. Locking means are included for locking the drawer in its closed position.

A computer drawer assembly comprises a computer having an enclosure with at least one unused, standard-sized, 5¼ inch expansion slot, the expansion slot having a detachable plate covering an entrance to the expansion slot, the computer enclosure being removable and the computer having a frame covered by the enclosure.

A rectangular drawer holder is sized for being received and closely fitting into the unused expansion slot after removal of the detachable plate, the drawer holder being formed having a bottom, a top, opposing side walls and an open front. A drawer is sized for fitting into the drawer holder from the drawer holder open front, the drawer being formed having a bottom, opposing sides and a closed front and rear, the drawer being axially slidable in the drawer holder between a closed position fully received in the drawer holder and an open position extending from the open front of the drawer holder. At least one attaching screw aperture is formed in each of the drawer holder opposing side walls, the location of the attaching screw apertures corresponding to a location of corresponding standard installation screw apertures in the computer frame for installing standard hardware in the expansion slot, whereby the drawer holder is secured in the unused expansion slot by screws extending through said computer frame and into drawer holder screw apertures.

A lock is provided for locking the drawer in its closed position. Preferably the drawer and drawer holder are constructed from a rigid plastic material.

BRIEF DESCRIPTION OF THE DRAWINGS

The present invention can be more readily understood by a consideration of the following detailed description when taken in conjunction with the accompanying drawings, in which:

FIG. 1 is a partial perspective drawing of a conventional computer having computer enclosure with four conventional expansion slots: FIG. 1A showing the computer enclosure with two filled expansion slots and two unused expansion slots with cover plates covering them; FIG. 1B showing the same computer enclosure with the cover plate removed from one of the unused expansion slots.

FIG. 2 is a partially cutaway drawing looking at one side of the computer enclosure, showing the installation of screws that retain the drawer holder in the previously unused expansion slot in which the drawer assembly is installed;

FIG. 4 is a transverse cross sectional drawing looking along line 4—4 of FIG. 3, showing additional features of the drawer assembly and showing the attachment of the drawer holder to an internal frame of the computer enclosure by screws.

In the various FIGS., the same elements and features are given the same reference numbers.

DESCRIPTION OF THE PREFERRED EMBODIMENT

Figure 1C:
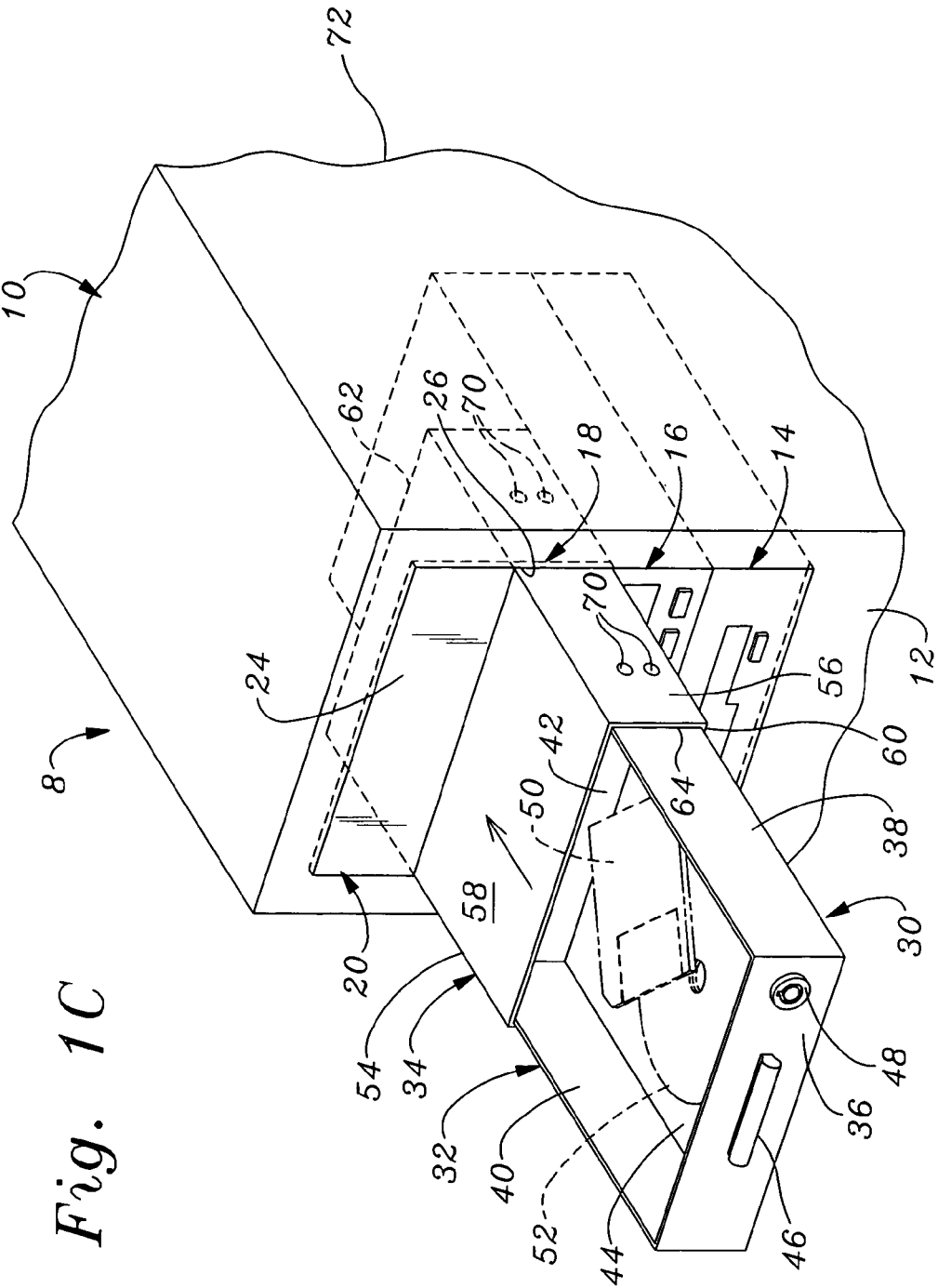
FIG. 1C showing the same computer enclosure with the drawer assembly of the present invention partially installed into the unused expansion slot from which the cover plate was removed.

In accordance with a preferred embodiment of the present invention there is depicted in FIG. 1A, in partially cut-away form, a representative computer 8 that is enclosed in a detachable computer enclosure or cabinet 10, which is typically constructed of plastic or sheet metal in a more or less decorative fashion. With no limitation being thereby intended or implied, computer 8 is depicted as a stand-alone "tower-type" computer. It is, however, to be understood that the following description applies equally to rack-mounted computers and enclosures thereof.

Looking at a front 12 of computer enclosure 10, two used (filled) standard expansion slots or bays 14 and 16 and two unused (empty) standard expansion slots or bays 18 and 20 are shown. All expansion slots 14–20, which are located above internal computer circuitry and related hardware, such as hard drives, are conventionally referred to as 5.25 inch by 1.5 inch slots. As will be evident from the following description, actual expansion slot dimensions may be somewhat different.

By way of example only, and not concerned with the present invention, used expansion slot 14 may contain a conventional floppy disc drive, such as a 3.5 inch disc drive, and used expansion slot 16 may contain a conventional CD or DVD drive. Unused or empty expansion slots 18 and 20 are shown closed in front by respective removable cover plates 22 and 24.

FIG. 1B depicts the same computer enclosure 10 shown in FIG. 1A, with cover plate 22 detached from unused expansion slot 18, thereby providing access to a region 26 inside the computer 8, through the open expansion slot.

A drawer assembly 30 of the present invention is shown in FIG. 1C partially received into computer inside region 26 through open expansion slot 18. As shown, drawer assembly 30 comprises a drawer 32 and a drawer holder 34 into which the drawer is slidingly installed and which is sized to be closely received into computer inside region 26.

Drawer 32 is generally rectangular in shape and comprises a front wall 36, opposing upstanding sides 38 and 40, a back or rear wall 42 and a bottom 44, the drawer being sized to fit closely into drawer holder 34. A drawer pull 46 is joined to drawer front wall 36 and a small, key-operated lock 48 is installed in the front wall. Shown in phantom lines, by way of example, resting on drawer bottom 44 are a floppy disc 50 and a CD 52, both of which may be formatted for use with computer 8.

As shown in FIG. 1C, drawer holder 34 is a box-like structure formed having first and second upstanding sides 54 and 56, respectively, a top 58 and a bottom 60. A rearward end 62 of drawer holder 34 is preferably open, as is a front end 64 through which drawer 32 is received.

As further shown in FIG. 1C, two spaced-apart pairs of installation or mounting holes 70 are formed in drawer holder side 56 in locations corresponding to installation holes formed in side walls of conventional internal drives configured for installation in computer expansion slots. Similar pairs of installation or mounting holes (not shown in FIG. 1C) are formed in drawer holder opposite side wall 54.

Figure 1D:
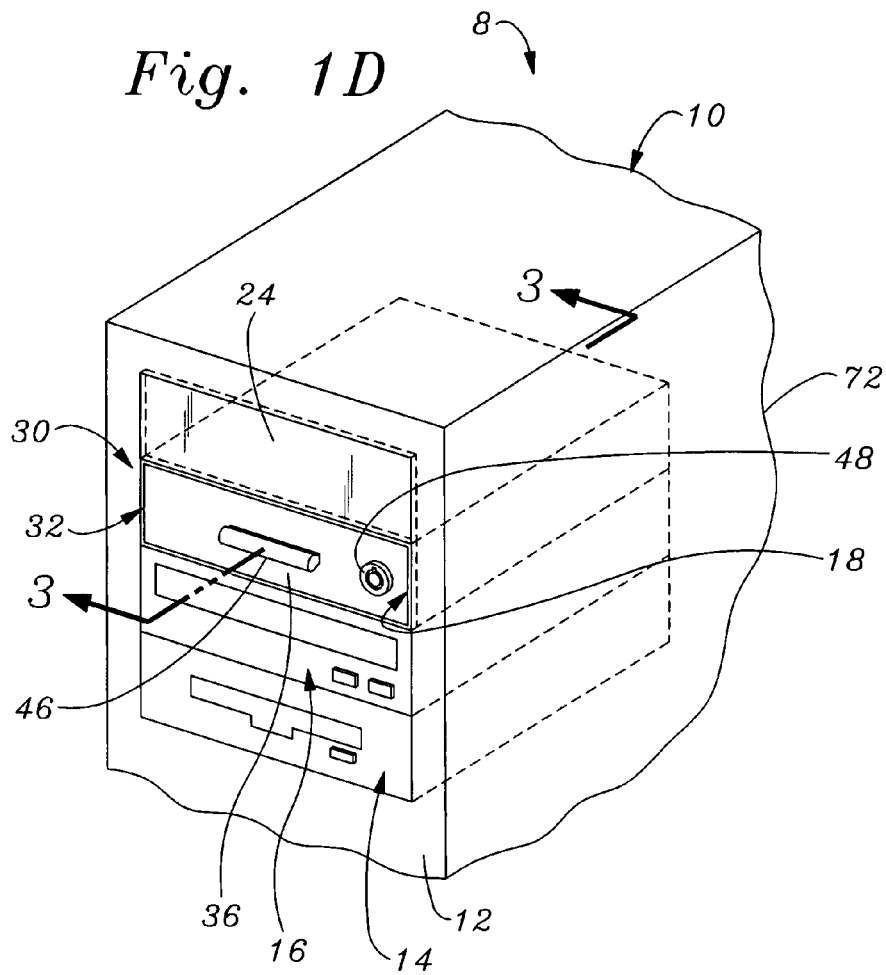
FIG. 1D showing the same computer enclosure with the drawer assembly fully received into the previously unused expansion slot.

FIG. 1D shows drawer assembly 30 fully received into computer 8 through expansion slot 18. Once installed in drawer holder 34, drawer 32 is slidably movable between a closed position in which the drawer is fully received into the drawer holder (FIG. 1D) and an open position in which the drawer extends from the drawer holder (FIG. 1C).

FIG. 2 shows part of one side 72 of computer enclosure 10 which is cut-away to show a computer frame region 74 (normally covered by enclosure 10) having two spaced apart pairs of slotted screw holes 76 through which two pairs of drawer assembly installation or mounting screws 78 are installed (after detachment of computer enclosure 10) and extend into drawer holder side mounting holes 70 (not shown) to retain draw holder 34, and hence drawer assembly 30, within open expansion slot 18 and in computer recess 26.

Figure 3:
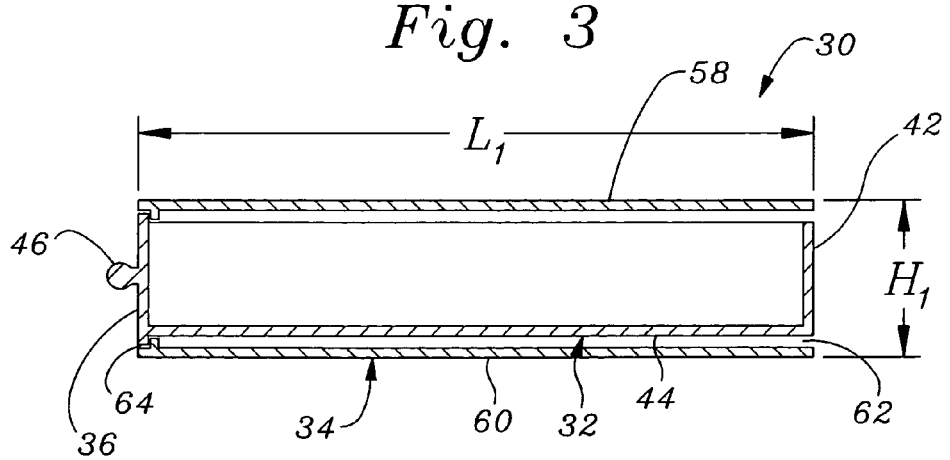
FIG. 3 is a transverse cross sectional drawing looking along line 3—3 of FIG. 1D, showing features of the computer drawer assembly.

As shown in FIG. 3, drawer holder top 58 and bottom 60, as well as sides 54 and 56 (not shown), as well as drawer bottom 44, each have a length, $L_1$, of about 7.875 inches. A narrow transverse rib 78 is formed along an under side of drawer holder top 58 spaced slightly inward from drawer holder front opening 64; a similar narrow rib 79 is formed along an upper side of drawer holder bottom 60 also spaced slightly inward from the drawer holder front opening. Corresponding slender rib (not shown) are formed along drawer holder sides 54 and 56. When drawer 32 is fully received into drawer holder 34, peripheral edge regions of drawer front wall 36 abut ribs 78, 79 and corresponding drawer holder side ribs to thereby stop further movement of the drawer into the drawer holder.

As shown in FIG. 4, drawer holder 34 has an overall width, $W_1$, of about 5.75 inches and an overall height, $H_1$ of about 1.625 inches. Drawer 32 is shown having an overall width, $W_2$, of about 5.375 inches and an overall height, $H_2$, of about 1.28 inches. Preferably drawer 32 is formed having respective narrow longitudinal guide rails 80 and 82 formed along the outside of drawer sides 38 and 40. Corresponding narrow longitudinal guide rails 84 and 86 are formed along the inside of drawer holder sides 56 and 54, respectively, so as to support drawer 32 on its guide rails 80 and 82 to enable smooth sliding of the drawer into and out of drawer holder 34. Also preferably, respective narrow short guide rails 88 and 90 are formed on the inside of drawer holder sides 56 and 54 at open front end 64 of the drawer holder slightly above corresponding longitudinal rails 84 and 86 to guide drawer side rails 80 and 82 into the drawer holder.

All parts of both drawer 32 and drawer holder 34 are preferably formed of a rigid plastic material having a thickness, $t_1$, of about 0.063 inches (except for rails 80–90). Such plastic material is preferred over the use of sheet metal since sensitive digital media stored in drawer could be corrupted by metal if the metal becomes magnetized.

FIG. 4 further illustrates the mounting of drawer holder 34 inside computer 8 by screws 78 (four being shown) which extend through one side frame region 74 and a corresponding opposite side frame region 92 into mounting holes 70 formed in drawer sides 56 and 54. A computer enclosure side 94 is shown outwardly of frame region 92.

It is to be appreciated that more than one drawer assembly 30 may be installed in a single computer if corresponding unused expansion bays are available. Moreover, although drawer assembly 30 has been described as beneficial for storing CDs, DVDs and/or floppy discs to be used with particular computer 8 in which the drawer assembly is installed, other small items, such as pencils, pens, tools and the like may be conveniently stored in drawer 32.

Thus, although there is described and illustrated herein a computer storage drawer assembly for storing computer related items for purposes of illustrating the manner in which the present invention may be used to advantage, it is to be understood that the invention is not limited thereto. Consequently, any and all variations and equivalent arrangements which may occur to those skilled in the applicable art are to be considered to be within the scope and spirit of the invention as set forth in the claims which are appended hereto as part of this application.

What is claimed is:

1. A computer drawer assembly comprising:
   a. a computer having an enclosure with an unused, standard-sized expansion slot, said unused expansion slot having a detachable plate covering an entrance to said unused expansion slot, said computer enclosure being detachable from said computer and said computer includes a frame covered by said enclosure;
   b. a rectangular drawer holder sized for being fully received and closely fitting into said unused expansion slot after removal of said detachable plate, said drawer holder being formed having a bottom, a top, opposing side walls and an open front;
   c. a drawer sized for fitting closely into said drawer holder through said drawer holder open front, said drawer being formed having a bottom, opposing sides and a closed front and rear, said drawer being axially slidable in said drawer holder between a closed position received in said drawer holder and an open position extending from said open front of the drawer holder; and wherein at least one attaching screw aperture is formed in each of said drawer holder opposing side walls, the location of said attaching screw apertures corresponding to a location of standard installation screw apertures in said computer frame for installing standard hardware in said expansion slot, whereby said drawer holder can be secured in said unused expansion slot.

2. The computer drawer assembly as claimed in claim 1, wherein said standard-sized expansion slot is a conventional 5¼ inch expansion slot.

3. The computer drawer assembly as claimed in claim 1, wherein four attaching screw apertures are formed in each of said drawer holder opposing side walls, the location of said attaching screw apertures corresponding to a location of standard installation screw apertures in said cabinet frame for installing standard hardware in said expansion slot, whereby said drawer holder can be secured in said unused expansion slot.

4. The computer drawer assembly as claimed in claim 1, including a lock installed in said drawer for locking said drawer in said closed position relative to said drawer holder.

5. The computer drawer assembly as claimed in claim 1, wherein said drawer and drawer holder are constructed from a rigid plastic material.

6. A computer drawer assembly comprising:
   a. a computer having a computer enclosure with at least one unused, standard-sized, 5¼ inch expansion slot, said expansion slot having a detachable plate covering an entrance to said expansion slot, said computer enclosure being detachable from said computer and wherein said computer includes a frame covered by said enclosure;
   b. a rectangular drawer holder sized for being received and closely fitting into said unused expansion slot after removal of said detachable plate, said drawer holder being formed having a bottom, a top, opposing side walls and an open front;
   c. a drawer sized for fitting closely into said drawer holder through said drawer holder open front, said drawer being formed having a bottom, opposing sides and a closed front and rear, said drawer being axially slidable in said drawer holder between a closed position fully received in said drawer holder and an open position extending from said open front of the drawer holder;

d. means for securing said drawer holder in said unused expansion slot when said drawer holder is fully received into said unused expansion slot; and wherein four attaching screw apertures are formed in each of said drawer holder opposing side walls, the location of said attaching screw apertures corresponding to a location of standard installation screw apertures in said computer frame for installing standard hardware in said expansion slot, whereby said drawer holder can be secured in said unused expansion slot.

7. The computer drawer assembly as claimed in claim 6, including locking means for locking said drawer in said closed position.

8. A computer drawer assembly comprising:

a. a computer having an enclosure with at least one unused, standard-sized, 5¼ inch expansion slot, said expansion slot having a detachable plate covering an entrance to said expansion slot, said computer enclosure being removable and said computer having an frame covered by said enclosure;

b. a rectangular drawer holder sized for being received and closely fitting into said unused expansion slot after removal of said detachable plate, said drawer holder being formed having a bottom, a top, opposing side walls and an open front;

c. a drawer sized for fitting closely into said drawer holder through said drawer holder open front, said drawer being formed having a bottom, opposing sides and a closed front and rear, said drawer being axially slidable in said drawer holder between a closed position fully received in said drawer holder and an open position extending from said open front of the drawer holder; and d. at least one attaching screw aperture formed in each of said drawer holder opposing side walls, the location of said attaching screw apertures corresponding to a location of standard installation screw apertures in said computer frame for installing standard hardware in said expansion slot, whereby said drawer holder can be secured in said unused expansion slot by screws extending through said computer frame and into said drawer holder apertures.

9. The computer drawer assembly as claimed in claim 8, including a lock for locking said drawer in said closed position.

10. The computer drawer assembly as claimed in claim 8, wherein said drawer and drawer holder are constructed from a rigid plastic material.

* * * * *